UNITED STATES PATENT OFFICE.

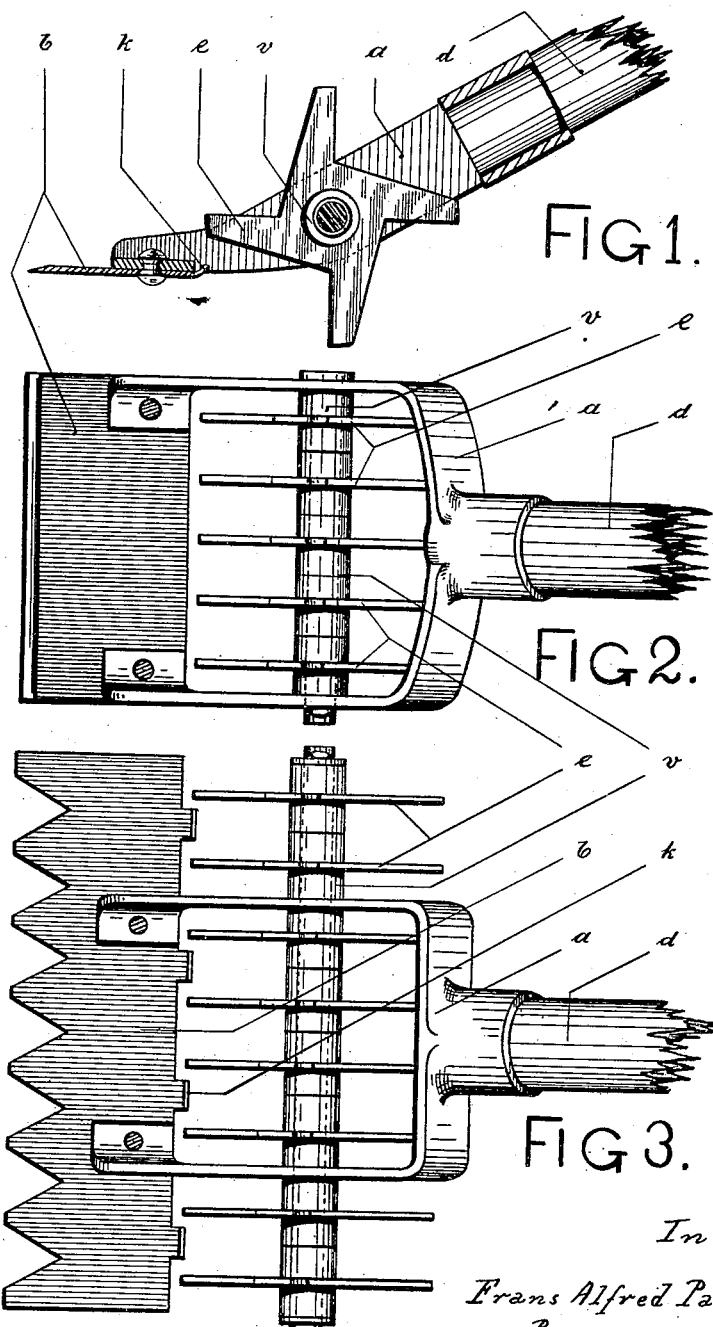

FRANS ALFRED PALOHEIMO, OF HELSINKI, FINLAND.

CULTIVATOR AND WEED-CUTTER.

1,371,706.  Specification of Letters Patent.  Patented Mar. 15, 1921.

Application filed February 24, 1920. Serial No. 360,845.

*To all whom it may concern:*

Be it known that I, FRANS ALFRED PALOHEIMO, a citizen of the State of Finland, residing at Helsinki, Finland, have invented certain new and useful Improvements in Cultivators and Weed-Cutters, of which the following is a specification.

This invention relates to cultivators and weed cutters and more particularly to a cultivator for cutting weeds.

When weeds are merely cut at the surface of the soil, it is frequent that they are not destroyed, but continue to grow and extend their roots increasingly. Ordinary weed cutters merely cut the weeds at the surface or near the surface and for the reason above given are not entirely effective and satisfactory.

It is an object of the present invention to provide a weed cutter which first cuts the weeds somewhat below the surface, by cutting a slice of soil, and then automatically and without a separate operation breaks up the slice of soil and the weeds contained therein simultaneously so as to insure that the weeds are severed or torn into as many pieces as possible and hence destroyed to a greater degree. The implement for accomplishing this object, which is the subject of the present invention, comprises a fixed knife portion suitably carried by a handle, and a rotary cutter comprising a plurality of star, or otherwise suitably shaped, wheels which cut the slice of soil and weeds as it passes from the knife, the rotary cutter being located immediately to the rear of the knife so as to be held down to working position by the part of the knife lodged below the surface of the soil, and so that the back of the knife will constitute a ledger bar for the action of the star wheels of the rotary cutter. The cutter wheels themselves extend into the relatively soft soil behind the knife so that the forward advance of the implement will cause the cutter to be rotated.

Other features and advantages will hereinafter appear.

In the accompanying drawing:

Figure 1 is a sectional side elevation of my implement, showing the handle broken away and the fork, knife and shaft for the rotary cutter in section.

Fig. 2 is a top plan view of one form of my invention, the knife being merely a straight edge and the star wheels of the rotary cutter being located entirely within the fork.

Fig. 3 is a top plan view of another form of my invention, in this form the knife edge being serrated or jagged and the star wheels of the rotary cutter being partly within and partly without the fork.

Referring now to the invention as shown in the drawings, the fork $a$ which may have any usual or desired formation, has rigidly secured to its lower end a knife $b$ whose cutting edge may be either straight or serrated, according to conditions or choice as may be desired. Immediately to the rear of the back edge of the knife $b$, I provide a series of star wheels $e$, each of which is mounted on a hub $v$ through which extends a shaft or rod mounted in the fork $a$. The fork is driven into the soil and forwardly to cut a slice of soil, along with any weeds that there may be, by means of a handle $d$ secured to the fork in the usual manner, or it may be made the desired size and be pulled or pushed by any suitable means, as by animals or motive power.

As the implement advances along the ground cutting a slice of the soil and the weeds, the star wheels which constitute a rotary cutter engage the soil as it slides along and off the top surface of the knife and chops or cuts it and the weeds it contains into fine pieces and thus cultivates the soil and destroys the weeds. The rotary cutter is mounted in the fork in such a manner that their outer edges, when the star wheels are rotated, come into close proximity to the rear edge of the knife which thus serves as a ledger blade or bar against which clods and weeds are engaged in being cut by the star wheels. The star wheel axis is also so located that the sides of the teeth of the star wheels will have good shearing action on the weeds and clods to be cut thereby, and so that the teeth of the star wheels will extend into the relatively soft soil behind the knife whereby the advance movements of the implement cause the star wheels to be rotated in the well known manner of a traction wheel.

I claim as my invention:

1. In a cultivator and weed cutter, the combination with a frame; a knife mounted in the frame and adapted to cut a slice of the soil from the surface along with the weeds contained therein as the frame is moved along the ground; and a rotary cutter located immediately to the rear of the knife and mounted to rotate in a vertical plane, said cutter being rotated by contact with the ground during the advance of the frame, and having its cutting elements juxtaposed and coöperating with the rear edge of the knife which constitutes a ledger bar against which the cutting elements disintegrate the soil and weeds as they pass over the rear edge of the knife.

2. In a cultivator and weed cutter, the combination with a frame; a horizontally disposed knife mounted in said frame and adapted to cut a slice of the soil from the surface along with the weeds contained therein as the frame is moved along the ground; and a rotary cutter located immediately to the rear of the knife and mounted to rotate in a vertical plane, said cutter comprising toothed cutting elements and a shaft on which the toothed cutting elements are mounted, the shaft being located in proximity to the horizontal plane in which the knife is situated so that the toothed members of the rotary cutter engage the ground and are rotated thereby as the frame is advanced along the ground, the rotation of the rotary cutter causing the toothed cutting elements to disintegrate the cut soil as the latter passes over the rear edge of the knife.

3. In a cultivator and weed cutter, the combination with a fork; a knife mounted at the forward portion of the fork and adapted to cut a slice of the soil from the surface along with the weeds contained therein as the fork is moved forwardly along the ground; and a rotary cutter located immediately to the rear of the knife, said rotary cutter comprising a shaft mounted in the fork and a plurality of star wheels journaled on the shaft, the shaft being located in proximity to the horizontal plane in which the knife is situated so that the points of the star wheels extend into the ground and are caused to rotate thereby as the fork is advanced along the ground, the rotation of the star wheels causing the cut soil and weeds as they pass from the knife to be disintegrated by the points of the star wheels.

In testimony whereof I have affixed my signature in presence of two witnesses.

FRANS ALFRED PALOHEIMO.

Witnesses:
 ANNA SCHROEDER,
 ESTAN IVANOFF.